United States Patent
Lu et al.

(10) Patent No.: US 11,979,847 B2
(45) Date of Patent: May 7, 2024

(54) IDENTIFYING NEARBY VEHICLES FOR CONNECTED VEHICLES

(71) Applicant: FORD GLOBAL TECHNOLOGIES, LLC, Dearborn, MI (US)

(72) Inventors: Chenliu Stephen Lu, Northville, MI (US); Judhajit Roy, Royal Oak, MI (US); Jonathan Barker, Detroit, MI (US); W. Cary Cole, Wixom, MI (US); Jared King, Southfield, MI (US); Kyle Yeakle, Royal Oak, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 432 days.

(21) Appl. No.: 17/493,289

(22) Filed: Oct. 4, 2021

(65) Prior Publication Data

US 2023/0107920 A1     Apr. 6, 2023

(51) Int. Cl.
*H04W 64/00* (2009.01)
*H04W 4/46* (2018.01)
*H04W 68/00* (2009.01)
*H04W 72/21* (2023.01)
*H04W 76/15* (2018.01)

(52) U.S. Cl.
CPC ........... *H04W 64/003* (2013.01); *H04W 4/46* (2018.02); *H04W 68/005* (2013.01); *H04W 72/21* (2023.01); *H04W 76/15* (2018.02)

(58) Field of Classification Search
CPC ..... H04W 64/003; H04W 4/46; H04W 76/15; H04W 72/21; H04W 68/005
See application file for complete search history.

(56) References Cited

U.S. PATENT DOCUMENTS

| | | | |
|---|---|---|---|
| 9,269,267 B2 * | 2/2016 | Goodwin | G08G 1/162 |
| 9,350,809 B2 | 5/2016 | Leppanen et al. | |
| 10,362,509 B2 * | 7/2019 | Mattela | H04W 4/90 |
| 2014/0334684 A1 | 11/2014 | Strimling | |
| 2017/0070480 A1 | 3/2017 | Blumenfeld et al. | |
| 2019/0311616 A1 * | 10/2019 | Jin | G05D 1/0297 |

OTHER PUBLICATIONS

Gaines, Apple AirTags: Everything You Need to Know, PC Magazine, May 10, 2021. Retrieved from https://www.pcmag.com/how-to/apple-airtag-tips#:~:text=You can use the app,it via on-screen directions.

* cited by examiner

*Primary Examiner* — Justin Y Lee
(74) *Attorney, Agent, or Firm* — Joseph Zane; Brooks Kushman P.C.

(57) ABSTRACT

Handshaking is performed, by an ego device via a wireless transceiver, with surrounding mobile devices to receive identifiers of the surrounding mobile devices and incoming notification messages from the surrounding mobile devices. Each of the incoming notification messages are sent from a different respective sender device of the surrounding mobile devices and include identifiers of devices seen by the sender device and an indication of whether issues with the devices seen by the sender device were identified by the sender device. An alert is raised responsive to an issue being indicated with the ego device based on the incoming notification messages.

21 Claims, 6 Drawing Sheets

| Reporting Vehicle | Nearby Vehicles | Issue? |
|---|---|---|
| A | B,D | Yes |
| B | A,C,E | No |
| C | B | No |
| D | A,E | No |
| E | B,D | Yes |

| Receiver | Positive Reports | Negative Reports |
|---|---|---|
| A | B,D | |
| B | C | A,E |
| C | B | |
| D | | A,E |
| E | B,D | |

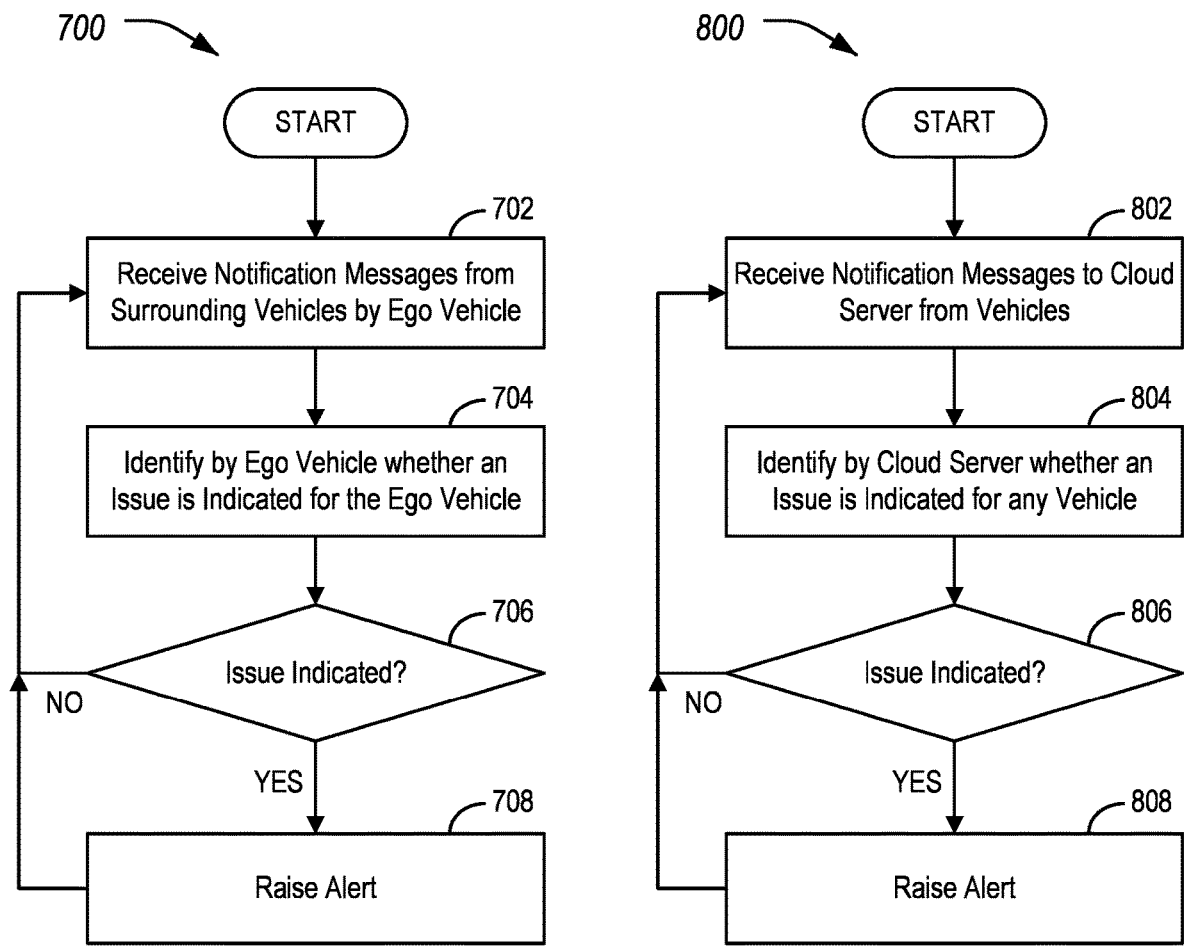

IDENTIFYING NEARBY VEHICLES FOR CONNECTED VEHICLES

TECHNICAL FIELD

Aspects of the disclosure relates to wireless network approaches for identification of nearby devices and data-driven approaches for identification of device issues from anonymized data.

BACKGROUND

V2X allows vehicles to exchange information with other vehicles, as well as with infrastructure, pedestrians, networks, and other devices. Vehicle-to-infrastructure (V2I) communication enables applications to facilitate and speed up communication or transactions between vehicles and infrastructure. In a vehicle telematics system, a telematics control unit (TCU) may be used for various remote control services, such as over the air (OTA) software download, eCall, and turn-by-turn navigation.

SUMMARY

In one or more illustrative embodiments, an ego device for crowd-sourced identification of device issues is provided. The ego device includes a wireless transceiver and a processor. The processor is programmed to handshake, via the wireless transceiver, with surrounding mobile devices to receive identifiers of the surrounding mobile devices and incoming notification messages from the surrounding mobile devices, each of the incoming notification messages being sent from a different respective sender device of the surrounding mobile devices and including identifiers of devices seen by the sender device and an indication of whether issues with the devices seen by the sender device were identified by the sender device, and raise an alert responsive to an issue being indicated with the ego device based on the incoming notification messages.

In one or more illustrative embodiments, a method for crowd-sourced identification of device issues is provided. Handshaking is performed, by an ego device via a wireless transceiver, with surrounding mobile devices to receive identifiers of the surrounding mobile devices and incoming notification messages from the surrounding mobile devices. Each of the incoming notification messages are sent from a different respective sender device of the surrounding mobile devices and include identifiers of devices seen by the sender device and an indication of whether issues with the devices seen by the sender device were identified by the sender device. An alert is raised responsive to an issue being indicated with the ego device based on the incoming notification messages.

In one or more illustrative embodiments, a non-transitory computer-readable medium includes instructions for crowd-sourced identification of device issues that, when executed by one or more processors, cause the one or more processors to perform operations including to handshake, by an ego device via the wireless transceiver, with surrounding mobile devices to receive identifiers of the surrounding mobile devices and incoming notification messages from the surrounding mobile devices, each of the incoming notification messages being sent from a different respective sender device of the surrounding mobile devices and including identifiers of devices seen by the sender device and an indication of whether issues with the devices seen by the sender device were identified by the sender device; and raise an alert responsive to an issue being indicated with the ego device based on the incoming notification messages.

BRIEF DESCRIPTION OF THE DRAWINGS

FIG. 7 illustrates an example process for receiving notifications messages by vehicles to determine potential issues; and FIG. 8 illustrates an example process for receiving notifications messages by a cloud server to determine potential issues.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A vehicle may use cameras and other sensors to collect information about the vehicle surroundings. This vehicle may be referred to as a data acquiring vehicle or an ego vehicle. The ego vehicle may collect information with respect to traffic, object detection, and/or diagnostic information about nearby observed vehicles. However, the ego vehicle may be unable to determine to which surrounding vehicle the relevant information should be communicated, as the ego vehicle would have to correlate the surrounding vehicles in the sensor data to vehicle identifications.

As described in detail herein, an approach for connected devices is provided to identify surrounding devices. This approach is provided in combination with big data collection to deduce which observed device is experiencing persistent issues using data sourced from a collective of surrounding devices. While the disclosure includes examples that are applied to connected vehicles, it should be noted that the disclosed approach is applicable to any connected device with sensors that monitors the external world. For instance, the disclosed examples are also applicable to mobile phones, tablets, smartwatches, etc.

Figure 1:
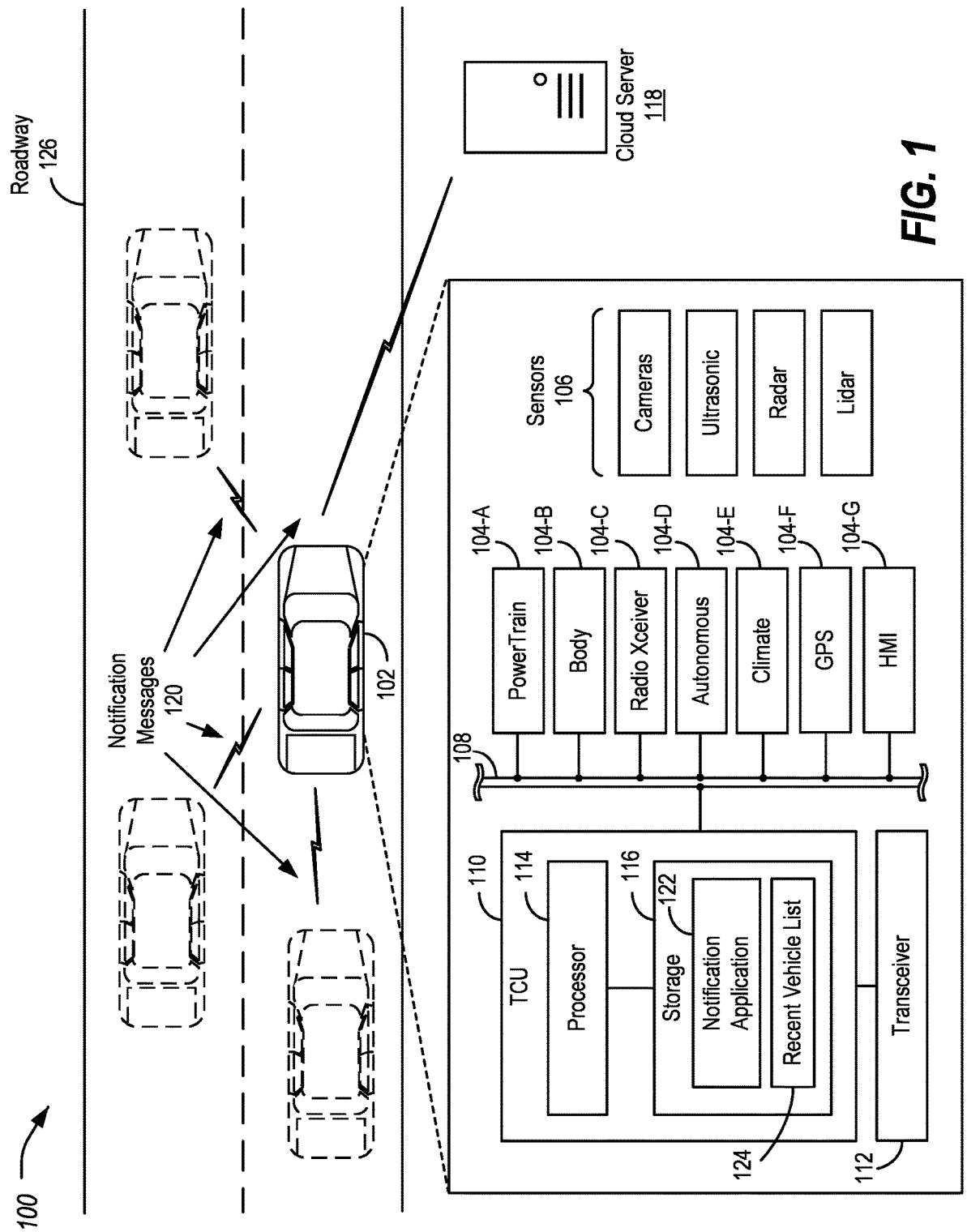
FIG. 1 illustrates an example system for performing wireless network approaches for identification of nearby devices and data-driven approaches for identification of specific devices from anonymized data.

FIG. 1 illustrates an example system 100 for performing wireless network approaches for identification of nearby devices and data-driven approaches for identification of specific devices from anonymized data. A vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may be a vehicle driven by a driver with driver assistance features. In other examples, the vehicle may be a semi-autonomous vehicle (AV). These AV or driver assistance features may be supported via received vehicle-to-everything (V2X) data. The level of automation may vary between different levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians, which may be equipped with V2X technology.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104-A through 104-G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an autonomous controller 104-D may be configured to provide commands to control the powertrain, steering, or other aspects of the vehicle 102; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human machine interface (HMI) controller 104-G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver assistance system (ADAS) cameras), ultrasonic sensors, radar systems, and/or lidar systems.

A vehicle bus 108 may include various methods of communication available between the vehicle controllers 104, as well as between a TCU 110 and the vehicle controllers 104. As some non-limiting examples, the vehicle bus 108 may include one or more of a vehicle controller area network (CAN), an Ethernet network, and a media-oriented system transfer (MOST) network. Further aspects of the layout and number of vehicle buses 108 are discussed in further detail below.

The TCU 110 may include network hardware configured to facilitate communication between the vehicle controllers 104 and with other devices of the system 100. For example, the TCU 110 may include or otherwise access a wireless transceiver 112 configured to facilitate communication with other vehicles 102 or with infrastructure. The TCU 110 may, accordingly, be configured to communicate over various protocols, such as with a communication network over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different wireless, peer-to-peer, and/or cellular technologies may be used for vehicle-to-vehicle communication. As some other examples, BLUETOOTH and/or Wi-Fi communication may be performed between the vehicles 102.

The TCU 110 may further include various types of computing apparatus in support of performance of the functions of the TCU 110 described herein. In an example, the TCU 110 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVASCRIPT, PERL, etc.

The TCU 110 may be configured to include one or more interfaces from which vehicle information may be sent and received. This information can be sensed, recorded, and sent to a cloud server 118. In an example, the cloud server 118 may also include one or more processors (not shown) configured to execute computer instructions, and a storage medium (not shown) on which the computer-executable instructions and/or data may be maintained.

The TCU 110 may be configured to facilitate the collection of connected vehicle data and/or other vehicle information from the vehicle controllers 104 connected to the one or more vehicle buses 108. While a single vehicle bus 108 is illustrated, it should be noted that in many examples, multiple vehicle buses 108 are included, with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

The TCU 110 may be further configured to transmit notification messages 120 for receipt by other vehicles 102. The TCU 110 may also be configured to receive notification messages 120 from other vehicles 102. In an example, the management of sending and receiving of connected vehicle data may be handled by a notification application 122 executed by the TCU 110. The notification messages 120 may include collected information retrieved over the vehicle buses 108 from the controllers 104 and from the sensors 106. The notification application 122 may further cause the TCU 110 to maintain a recent vehicle list 124 configured to list VINs, media access control (MAC) addresses and/or other identifiers of vehicles 102 in proximity to the vehicle 102. Further aspects of the notification messages 120 and recent vehicle list 124 are discussed in detail below.

While not shown, in some examples traffic participants may additionally involve communication via one or more roadside units (RSUs). The RSU may be a device with processing capabilities and networking capabilities and may be designed to be placed in proximity of a roadway 126 for use in communicating with the vehicles 102. In an example, the RSU may include hardware configured to communicate over the broadcast peer-to-peer protocol (such as PC5), to facilitate C-V2X communications with the vehicles 102. The RSU may, accordingly, be able to communicate with multiple vehicles 102 along a specific roadway 126 or in a specific area. The RSU may also have wired or wireless backhaul capability to allow for communication with other elements of a traffic control system, via e.g., Ethernet, or cellular connection to the cellular network infrastructure, for example over Uu interface.

Figure 2:
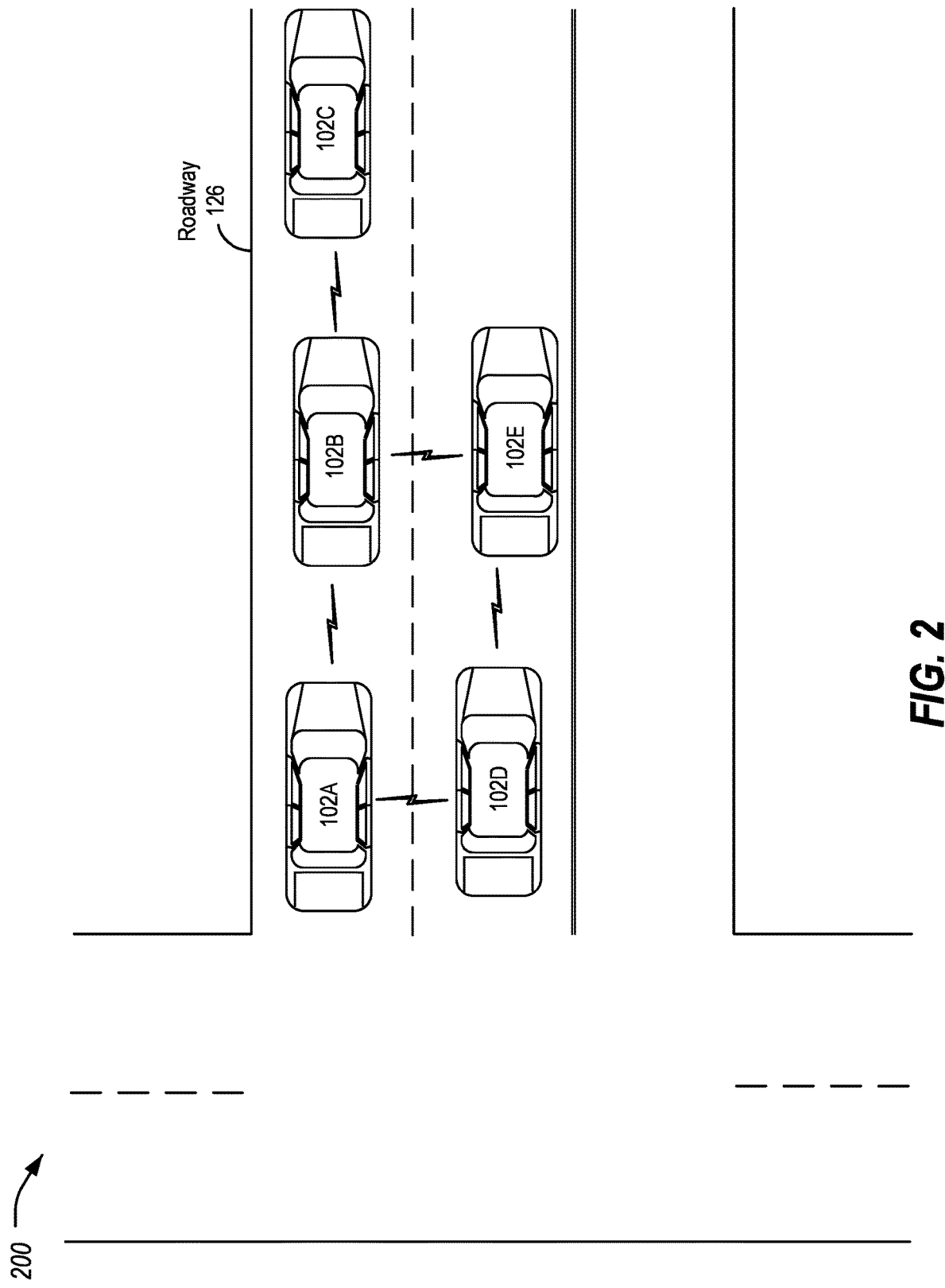
FIG. 2 illustrates an example of five vehicles stopped at an intersection, in accordance with an embodiment of the disclosure.

FIG. 2 illustrates an example 200 of vehicles 102 waiting at an intersection. When connected vehicles 102 are in close enough proximity, such as while waiting at the intersection, the wireless functionality of the vehicles 102 may be used to detect one another and to perform a handshake if the vehicles 102 remain within proximity of each other for a calibratable amount of time.

In the handshake, the vehicles 102 may exchange unique, rotating identifiers with one another, such as an encryption of their VIN or the MAC address of their modem. The vehicles 102 may perform this handshake for all the other vehicles 102 to which it is able to connect. These vehicles 102 may be referred to as the surrounding vehicles 102 to the ego vehicle 102 performing the communication. These vehicle identifiers may be added to the recent vehicle list 124, where they will be stored for a predefined amount of time (e.g., up to 5 minutes, up to 30 minutes, the most recent 10 vehicles 102, etc.) and then be actively wiped from the recent vehicle list 124 by the vehicle 102 itself. Thus, the recent vehicle list 124 for each vehicle 102 may maintain a list of the identifiers of other vehicles 102 within recent proximity to the vehicle 102.

As shown more specifically in FIG. 2, five vehicles 102 are stopped at an intersection (namely vehicles 102A, 102B, 102C, 102D, and 102E). By being stopped at the intersection, the vehicles 102 are in proximity to connect with each other to perform the handshakes. As shown, vehicle 102A is able to exchange information with vehicles 102B and 102D; the vehicle 102B is able to exchange information with vehicles 102A, 102C, and 102E; the vehicle 102C is able to exchange information with vehicle 102B, the vehicle 102D is able to exchange information with vehicles 102A and 102E; and the vehicle 102E is able to exchange information with vehicles 102B and 102D.

The vehicles 102 may be configured to send notification messages 120 based on the data from the sensors 106 and/or controllers 104. For instance, if one of the vehicles 102 gathers sensor data that is relevant for other vehicles 102, such as visually detecting a broken headlight, then the data gathering vehicle 102 may send a notification message 120 including the relevant information regarding any potential issues and the handshake identifiers currently stored to the recent vehicle list 124. If the data gathering vehicle 102 does not detect any issues, then the vehicle 102 may send a notification message 120 including the recent handshake identifiers from the recent vehicle list 124 and a no issues indication. It should be noted that the information from the sensors of the vehicle 102 most likely pertains to whatever vehicles 102 it is in proximity to, which is generally the vehicles 102 with which the vehicle 102 performs the handshake procedure.

The notification messages 120 may be sent to the cloud server 118 where the information contained within the notification messages 120 is aggregated. Additionally or alternatively, the notification messages 120 may be sent to the vehicles 102 within which the data gathering vehicle 102 is in proximity. It should be noted that the vehicle 102 receiving the notification message 120 may be unable to identify which identifier or vehicle 102 the data applies to. Instead, the vehicle 102 merely knows that some vehicle 102 among its list of recent handshakes is suffering the indicated issue.

Referring to the cloud server 118 aspect, the cloud server 118 may receive the notification messages 120 from the vehicles 102 and may correlate the multitude of notification messages 120 against one other. If a vehicle 102 has an identified issue, its vehicle identifier may consistently show up in broadcasts from other vehicles 102 that show there exists an issue among its nearby vehicles 102. Vehicles 102 with no issues may show up in broadcasts showing no issues as well as issues, due to the big data nature of this survey. This balance of positive and negative reports may indicate that the vehicle 102 is not experiencing issues. Using such criteria, it can be deduced which vehicles 102 have issues using various approaches, such as process of elimination or machine learning. The identified vehicle 102 (or their owners) may be notified by the cloud server 118 with respect to the potential for an issue being determined for the vehicle 102.

Figure 3:
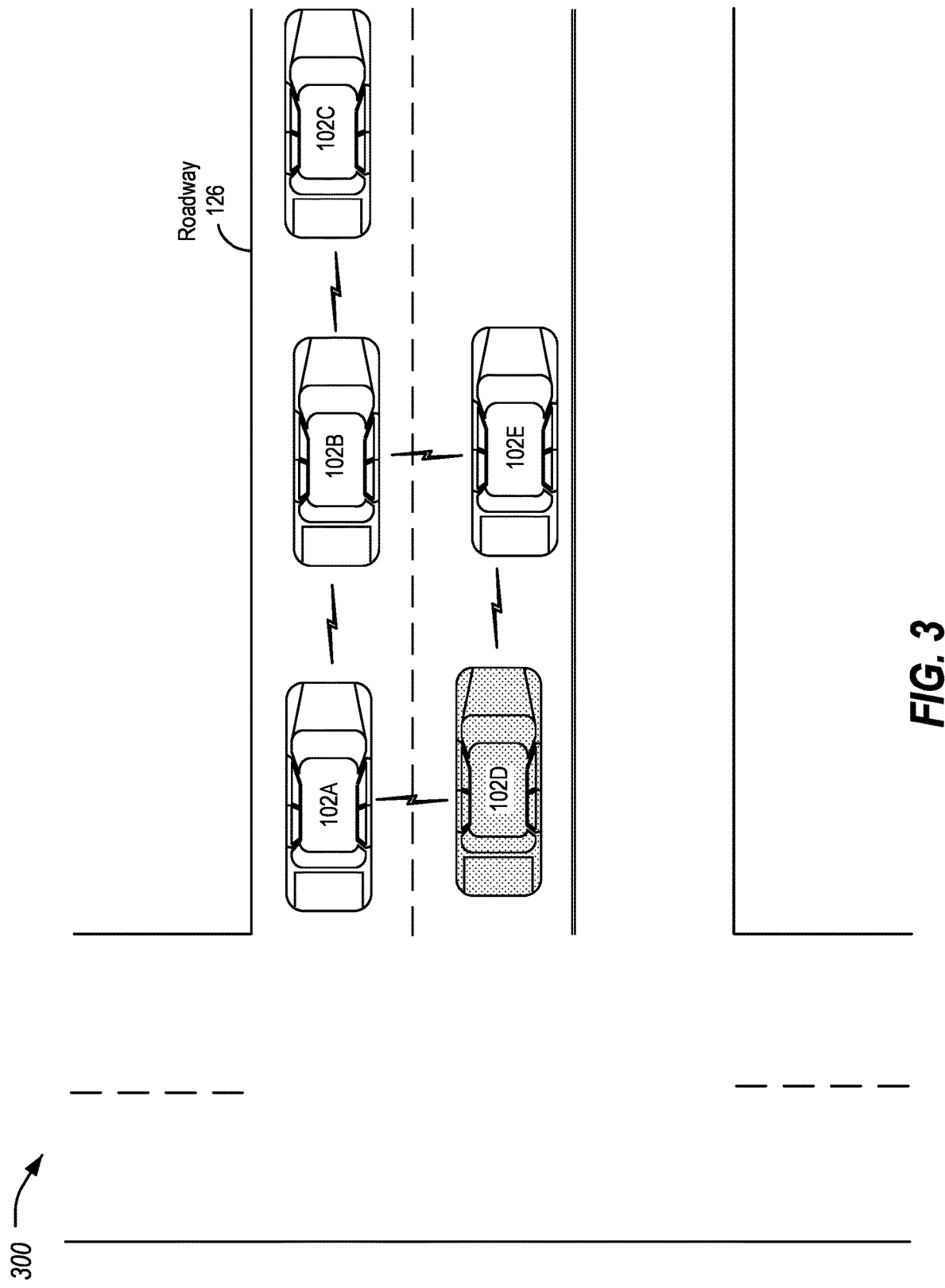
FIG. 3 illustrates an example of five vehicles stopped at an intersection, in accordance with an embodiment of the disclosure.

FIG. 3 illustrates an example of a vehicle 102 of the plurality of vehicles 102 experiencing an issue detectable by the plurality of vehicles 102. As shown, the vehicle 102D has an identifiable issue, such as a broken tail light. Continuing with the example of FIG. 2, the issue with vehicle 102D may be detectable by vehicles 102A and 102E.

Figure 4:
FIG. 4 illustrates an example of a cloud-based data aggregation of notification messages.

FIG. 4 illustrates an example 400 of a cloud-based data aggregation of notification messages 120. With continuing reference to FIG. 3, the notification message 120 from each of the vehicles 102A-E is received to the cloud server 118. As shown, the example 400 indicates for each sending vehicle 102, the identifiers of handshake vehicles 102 that are nearby as well as whether an issue was detected.

In the example, the vehicle 102A may transmit a notification message 120 indicating identifiers of vehicles 102B and 102D, as well as an indication that an issue was detected. That the issue was detected with vehicle 102D but not vehicle 102B is not indicated in the notification message 120. Instead, the notification message 120 simply indicates that an issue was seen. Additionally, the vehicle 102E may transmit a notification message 120 indicating identifiers of vehicles 102B and 102D, as well as an indication that an issue was detected. Moreover, the vehicle 102B may transmit a notification message 120 indicating identifiers of vehicles 102A, 102C, and 102E, as well as an indication that no issue was detected. The vehicle 102C may transmit a notification message 120 indicating an identifier of vehicle 102B and an indication that no issue was detected. The vehicle 102D may transmit a notification message 120 indicating identifiers of vehicles 102A and 102E as well as an indication that no issue was detected. It should be noted that the reports or notification messages 120 may have varying specificity, such as the generic existence of an issue or specific to the type of issue (e.g., front left headlight is broken) and which direction it was detected in (e.g., vehicle to the right of the ego vehicle).

Based upon the information received to the cloud server 118 in the notification messages 120, the cloud server 118 may increase the likelihood that vehicles 102B and 102D have issues. However, the cloud server 118 may decrease the confidence that vehicles 102A, 102C, and 102E have an issue. From this information it can be seen that the commonality of vehicles 102B and 102D is shown in the notification messages 120 that indicate an issue. It can also be seen that vehicle 102B was reported as not having an issue by the vehicle 102C. Thus, it can further be inferred that the issue is most likely with vehicle 102D, not with vehicle 102B (or the other vehicles 102).

Figure 5:
FIG. 5 illustrates an example of a vehicle approach to data aggregation of notification messages.

FIG. 5 illustrates an example of a vehicle 102 approach to data aggregation of notification messages 120. In such an approach, each vehicle 102 broadcasts notification messages 120 to all of its handshake partners, where the notification messages 120 include an issue flag indicating whether an issue was notified by the transmitting vehicle 102.

Continuing with the same example shown in FIG. 3, the vehicle 102A may receive notification messages 120 from vehicles 102B and 102D indicating no issue. The vehicle 102B may receive a notification message 120 from the vehicle 102C indicating no issue but may receive notification messages 120 from the vehicles 102A and 102E indicating a possible issue. The vehicle 102C may receive a notification message 120 from vehicle 102B indicating no issue. The vehicle 102D may receive notification messages 120 from vehicles 102A and 102E indicating a possible issue. The vehicle 102E may receive notification messages 120 from vehicles 102B and 102D indicating no issue.

Thus, each vehicle 102 may receive one or more positive or negative reports. Receiving a positive report may increase a confidence that the vehicle 102 has a specified issue, while receiving a negative report may decrease a confidence that the vehicle 102 has the specified issue.

A vehicle 102 with no issues may receive a balance of positive and negative reports, whereas a vehicle 102 with issues may receive mostly, if not all, positive reports. When a confidence surpasses a predefined threshold (e.g., 70%, 75%, 80%, 85%, 90%, 95%, 98%, 100%, etc.), the vehicle 102 may alert the owner, fleet manager, or other manager of the vehicle 102 of the potential for there being an issue.

It should be noted that this approach does not require the storing of handshake identifiers or other personal identifiable information. Instead, the approach operates because it relies upon an aggregation of information from the notification messages 120 that is anonymous. Although no single vehicle 102 is able to deduce the source of the issue, the collective data that is generated may be able to pinpoint which vehicle 102 is experiencing the issue.

Figure 6:
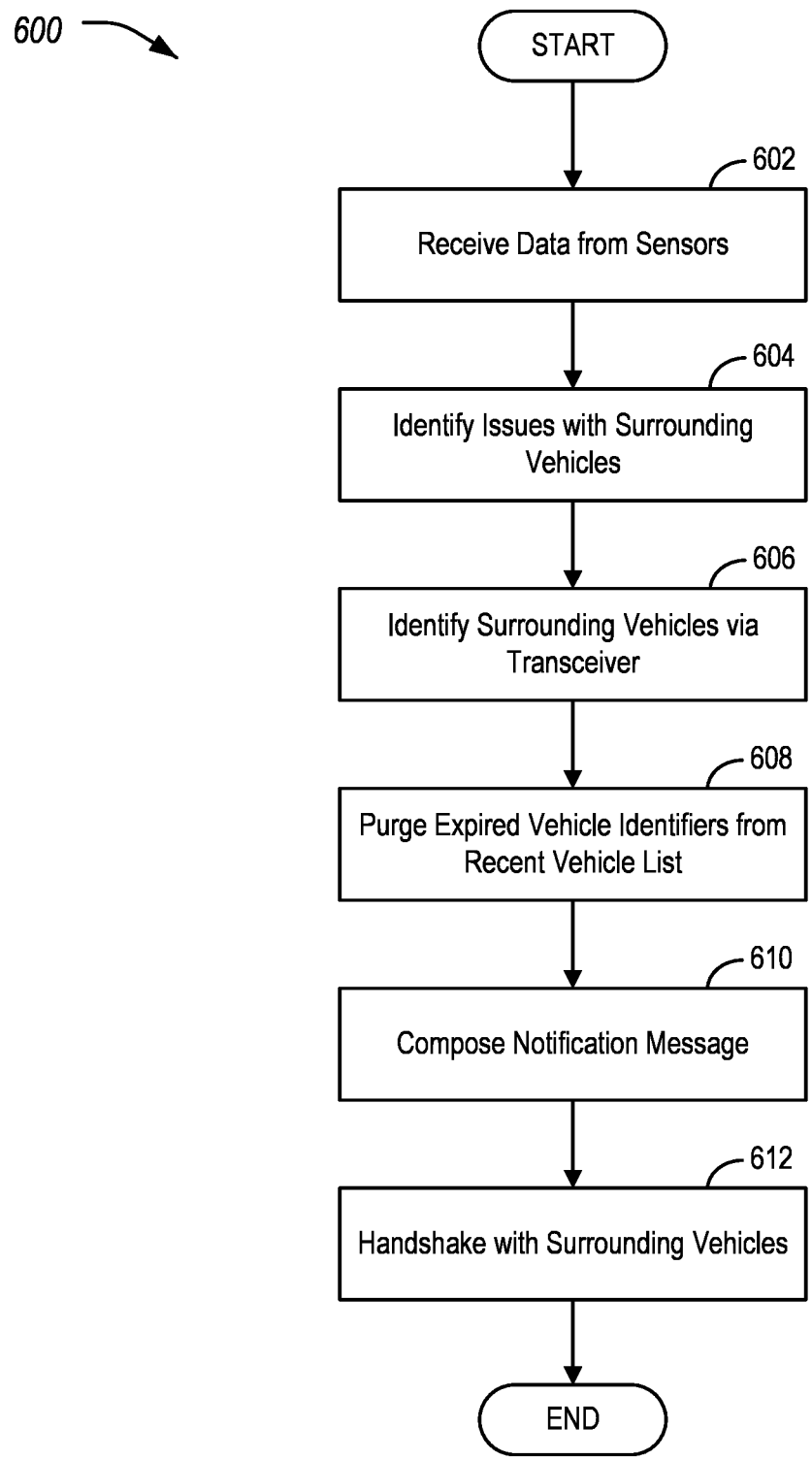
FIG. 6 illustrates an example process for sending notification messages by vehicles.

FIG. 6 illustrates an example process 600 for sending notification messages 120 by vehicles 102. In an example, the process 600 may be performed by the vehicle 102 in the context of the system 100. For sake of explanation, the process 600 is described from the perspective of a single vehicle 102, referred to herein as an ego vehicle 102.

At operation 802, the ego vehicle 102 receives data from the sensors 106. In an example, cameras, ultrasonic sensors, radar systems, and/or lidar systems of the ego vehicle 102 may capture images or other data with respect to other vehicles 102 along the roadway 126.

At operation 604, the ego vehicle 102 identifies issues with surrounding vehicles 102. In an example, the ego vehicle 102 may utilize image recognition techniques such as machine learning to identify visual issues with surrounding vehicles 102 (such as a broken vehicle light).

At operation 606, the ego vehicle 102 identifies surrounding vehicles 102. In an example, the ego vehicle 102 may stop at an intersection or other location at which the surrounding vehicles 102 are within proximity to the ego vehicle 102. This may include utilizing the wireless transceiver 112 to receive vehicle identifiers with the vehicles 102 in proximity to the ego vehicle 102. Any received vehicle identifiers may be added to the recent vehicle list 124 along with an indication of the current time. If an identifier is already on the recent vehicle list 124, then the time of addition of the identifier may be updated to the more recent time.

At operation 608, the ego vehicle 102 purges expired vehicle identifiers from the recent vehicle list. In an example, any identifiers on the recent vehicle list 124 that are older than a predefined amount of time may be wiped from the recent vehicle list 124.

At operation 610, the ego vehicle 102 composes a notification message 120. The notification message 120 may include the identifiers of the handshake vehicles 102 on the recent vehicle list 124 as updated via operations 606 and 608. The notification message 120 may also include an indication of any issues identified at operation 804. If no issues were identified, an indication of no issues may instead be included in the notification message 120. Significantly, the notification message 120 does not indicate that an issue is experiences with any particular vehicle 102 or vehicles 102.

At operation 612, the ego vehicle 102 handshakes with the surrounding vehicles 102. The handshake messaging may accordingly allow for the other vehicles 102 to identify the ego vehicle 102 (e.g., as the other vehicles 102 independently perform operations 606 and 608 of the process 600). As part of the handshake process, the vehicle 102 may send the notification message 120 as composed at operation 610.

After operation 612 the process 600 ends. It should be noted that the process 600 is illustrated as a sequential set of operations. However, in practice one or more operations of the process 600 may be performed concurrently. Moreover, the process 600 may be performed continuously or in a loop wise manner.

FIG. 7 illustrates an example process 700 for receiving the notification messages 120 by the vehicles 102 to determine potential issues. In an example, the process 700 may be performed by an ego vehicle 102, similar to and potentially concurrent to the performance of the process 600.

At operation 702, the ego vehicle 102 receives notification messages 120 from surrounding vehicles 102. The notification messages 120 may be received from vehicles 102 performing the process 600, including the handshaking with the surrounding vehicles 102 discussed with respect to operation 612. An example of received notification messages 120 is shown in FIG. 5.

At operation 704, the ego vehicle 102 identifies whether the received notification messages 120 indicate an issue with the ego vehicle 102. In an example, the ego vehicle 102 may receive a mix of positive and negative reports. In such an instance, the ego vehicle 102 may infer that there is no issue with the ego vehicle 102 itself. In another example, the ego vehicle 102 may receive all or mostly all positive reports. In such an instance, the ego vehicle 102 may infer that there is a potential for their being an issue with the ego vehicle 102 itself.

At operation 706, if an issue is detected, control passes to operation 708 to raise an alert. If not, control returns to operation 702. At operation 708, the alert is issued indicating the potential for an issue (or an indication of the issue if stated in the notification messages 120). In some examples, the alert is issued to an HMI within the ego vehicle 102. In other examples, the alert may be sent to the cloud server 118. In yet another example, the alert may be sent to a mobile device of an owner or operator of the ego vehicle 102.

After operation 708 the process 700 ends. It should be noted that the process 700 is illustrated as a sequential set of operations. However, in practice one or more operations of the process 700 may be performed concurrently. Moreover, the process 700 may be performed continuously or in a loop wise manner, and/or concurrently with the process 600 as noted above.

FIG. 8 illustrates an example process 800 for receiving the notification message 120 by the cloud server 118 to determine potential issues. In an example, the process 800 may be performed by the cloud server 118 in the context of the system 100.

At operation 802, the cloud server 118 receives notification messages 120 from surrounding vehicles 102. Similar to as discussed above with respect to operation 702 of the process 700, the notification messages 120 may be received from vehicles 102 performing the process 600, including the handshaking with the surrounding vehicles 102 discussed with respect to operation 612. An example of received notification messages 120 is shown in FIG. 4.

At operation 804, the cloud server 118 identifies whether the received notification messages 120 indicate an issue with the ego vehicle 102. In an example, the cloud server 118 may utilize the commonality of vehicle identifiers in the notification messages 120 by process of elimination to determine which vehicle 102 or vehicles 102 may be experiencing an issue. In another example, the notification messages 120 may be provided to a machine learning model that is trained to identify which vehicles 102 are likely to have issues based on the notification messages 120.

At operation 806, if an issue is detected, control passes to operation 808 to raise an alert. If not, control returns to operation 802. At operation 808, the alert is issued indicating the potential for an issue (or an indication of the issue if stated in the notification messages 120). In some examples, the alert is sent to the vehicle 102 experiencing the issue for display by the vehicle 102. In another example, the alert may be sent to a mobile device of an owner or operator of the ego vehicle 102.

After operation 808 the process 800 ends. It should be noted that the process 800 is illustrated as a sequential set of operations. However, in practice one or more operations of the process 800 may be performed concurrently.

Computing devices described herein, such as the controllers 104, TCU 110, and cloud server 118 generally include computer-executable instructions where the instructions may be executable by one or more computing devices such as those listed above. Computer-executable instructions, such as those of the notification application 122, may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An ego device for crowd-sourced identification of device issues, comprising:
 a wireless transceiver of the ego device; and
 a processor of the ego device programmed to
  handshake, via the wireless transceiver, with surrounding mobile devices to receive identifiers of the surrounding mobile devices and incoming notification messages from the surrounding mobile devices,
  each of the incoming notification messages being sent from a different respective sender device of the surrounding mobile devices and including identifiers of devices seen by the sender device and an indication of whether issues with the devices seen by the sender device were identified by the sender device, and
  raise an alert responsive to an issue being indicated with the ego device based on the incoming notification messages.

2. The ego device of claim 1, further comprising:
 one or more sensors of the ego device,
 wherein the processor is further programmed to
  capture, from the one or more sensors, sensor data of observed mobile devices,
  identify issues with the observed mobile devices according to the sensor data, and
  send outgoing notification messages to the surrounding mobile devices, via the wireless transceiver, the outgoing notification messages including the identifiers of the surrounding mobile devices and an indication of whether issues with the observed mobile devices were identified by the ego device.

3. The ego device of claim 2, wherein the incoming notification messages and the outgoing notification messages avoid inclusion of personal identifiable information.

4. The ego device of claim 2, wherein the ego device, the observed mobile devices, and the surrounding mobile devices are vehicles.

5. The ego device of claim 2, wherein one or more of the ego device, the observed mobile devices, and the surrounding mobile devices are mobile phones.

6. The ego device of claim 1, wherein the processor is further programmed to determine an issue is indicated with the ego device based on the incoming notification messages indicating an issue with at least a minimum threshold.

7. The ego device of claim 6, wherein the minimum threshold is a minimum percentage of the incoming notification messages.

8. A method for crowd-sourced identification of device issues, comprising:
 handshaking, by an ego device via a wireless transceiver, with surrounding mobile devices to receive identifiers of the surrounding mobile devices and incoming notification messages from the surrounding mobile devices, each of the incoming notification messages being sent from a different respective sender device of the surrounding mobile devices and including identifiers of devices seen by the sender device and an indication of whether issues with the devices seen by the sender device were identified by the sender device; and
 raising an alert responsive to an issue being indicated with the ego device based on the incoming notification messages.

9. The method of claim 8, further comprising:
 capturing, from one or more sensors of the ego device, sensor data of observed mobile devices;
 identifying issues with the observed mobile devices according to the sensor data; and
 sending outgoing notification messages to the surrounding mobile devices, via the wireless transceiver, the outgoing notification messages including the identifiers of the surrounding mobile devices and an indication of whether issues with the observed mobile devices were identified by the ego device.

10. The method of claim 9, wherein the incoming notification messages and the outgoing notification messages avoid inclusion of personal identifiable information.

11. The method of claim 8, further comprising determining an issue is indicated with the ego device based on the incoming notification messages indicating an issue with at least a minimum threshold.

12. The method of claim 11, wherein the minimum threshold is a minimum percentage of the incoming notification messages.

13. The method of claim 8, wherein the ego device and the surrounding mobile devices are vehicles.

14. The method of claim 8, further comprising:
 sending the notification messages from the ego device and the surrounding mobile devices to a cloud server;
 determining, by the cloud server, which of the ego device and the surrounding mobile devices are experiencing an issue; and
 raising an alert responsive to an issue being indicated with the ego device or one or more of the surrounding mobile devices based on the notification messages.

15. A non-transitory computer-readable medium comprising instructions for crowd-sourced identification of device issues that, when executed by one or more processors, cause the one or more processors to perform operations including to:
 handshake, by an ego device via a wireless transceiver of the ego device, with surrounding mobile devices to receive identifiers of the surrounding mobile devices and incoming notification messages from the surrounding mobile devices, each of the incoming notification messages being sent from a different respective sender device of the surrounding mobile devices and including identifiers of devices seen by the sender device and an indication of whether issues with the devices seen by the sender device were identified by the sender device; and
 raise an alert responsive to an issue being indicated with the ego device based on the incoming notification messages.

16. The medium of claim 15, further comprising instructions that, when executed by the one or more processors, cause the one or more processors to perform operations including to:
- capture, from one or more sensors of the ego device, sensor data of observed mobile devices;
- identify issues with the observed mobile devices according to the sensor data; and
- send outgoing notification messages to the surrounding mobile devices, via the wireless transceiver, the outgoing notification messages including the identifiers of the surrounding mobile devices and an indication of whether issues with the observed mobile devices were identified by the ego device.

17. The medium of claim 16, wherein the incoming notification messages and the outgoing notification messages avoid inclusion of personal identifiable information.

18. The medium of claim 16, wherein in the ego device, the observed mobile devices, and the surrounding mobile devices are vehicles.

19. The medium of claim 15, further comprising instructions that, when executed by the one or more processors, cause the one or more processors to perform operations including to determine an issue is indicated with the ego device based on the incoming notification messages indicating an issue with at least a minimum threshold.

20. The medium of claim 19, wherein the minimum threshold is a minimum percentage of the incoming notification messages.

21. The medium of claim 15, further comprising instructions that, when executed by the one or more processors, cause the one or more processors to perform operations including to
- sending the notification messages from the ego device and the surrounding mobile devices to a cloud server;
- determining, by the cloud server, which of the ego device and the surrounding mobile devices are experiencing an issue; and
- raising an alert responsive to an issue being indicated with the ego device or one or more of the surrounding mobile devices based on the notification messages.

* * * * *